United States Patent [19]

Hope et al.

[11] Patent Number: 5,006,431
[45] Date of Patent: Apr. 9, 1991

[54] SOLID STATE POLYMER ELECTROLYTE FOR BATTERIES

[76] Inventors: Henry F. Hope; Stephen F. Hope, both of c/o Hope Industries 5701 Morland Rd., Willow Grove, Pa. 19090

[21] Appl. No.: 313,993

[22] Filed: Feb. 23, 1989

[51] Int. Cl.$^5$ .............................................. H01M 6/18
[52] U.S. Cl. .................................................... 429/192
[58] Field of Search ......................................... 429/192

[56] References Cited

U.S. PATENT DOCUMENTS

| 4,556,614 | 12/1985 | Mehaute et al. | 429/192 |
| 4,654,279 | 3/1987 | Bauer et al. | 429/192 |
| 4,737,422 | 4/1988 | Knight et al. | 429/192 |
| 4,758,483 | 7/1988 | Armand et al. | 429/192 |
| 4,830,939 | 5/1989 | Lee et al. | 429/192 |
| 4,844,995 | 8/1989 | Noda et al. | 429/192 |

Primary Examiner—Donald L. Walton
Attorney, Agent, or Firm—Zachary T. Wobensmith, III

[57] ABSTRACT

A solid state polymer electrolyte which is formed by mixing an ultraviolet light or electronbeam curable epoxide based polymer with an electrolyte and curing the mixture whereby the polymer cross links and forms a solid state or semi-solid state electrolyte.

8 Claims, No Drawings

SOLID STATE POLYMER ELECTROLYTE FOR BATTERIES

BACKGROUND OF THE INVENTION

1. Field of the Invention

An electrolyte of the type which contains an ultraviolet light or electronbeam radiation curable cross linking polymer component.

2. Description of the Prior Art

In the prior art various polymers have been used as a component of the electrolytes of solid state alkaline and alkaline earth metal batteries, and various other kinds of batteries.

Among the problems associated with these polymers is that they have inherent relatively low ionic conductivity, and also may react with the alkaline metal, such as lithium, or other metallic anodes to form a non conductive boundary layer, which presents the free flow of ions and hinders rechargability.

The prior art polymer containing electrolytes may also exhibit poor adherence to the electrodes, and do not possess sufficient strength to prevent the punching through of dendrites and consequent shorting of the battery.

Some electrolytes use as one component an acrylite based ultraviolet light curable material, which has relatively short shelf life, exhibits poor adhesion qualities, has a high rate of shrinkage, as well as producing irritation, sensitization hazards, has high toxicity and requires an inert nitrogen atmosphere for handling.

The solid state polymer containing electrolytes herein do not suffer from the prior art problems and provide many positive advantages.

SUMMARY OF THE INVENTION

It has now been found that an electrolyte which contains an ultraviolet light, or electronbeam curable epoxide based polymer, which is exposed to ultraviolet light, or electronbeam radiation causes the polymer to crosslink and form a solid state or semi-solid state electrolyte, which has a high ionic conductivity, is inert to battery component materials such as alkaline and alkaline earth metals and provides other benefits.

The principal object of the invention is to provide a solid or semi-solid state polymer electrolyte for batteries.

A further object of the invention is to provide an electrolyte of the character aforesaid that is inert to battery component materials.

A further object of the invention is to provide an electrolyte of the character aforesaid that has excellent adherence and low shrinkage properties.

A further object of the invention is to provide an electrolyte of the character aforesaid, that is flexible, tough and resistant to dendrite formation, but is easy to handle and produce.

A further object of the invention is to provide an electrolyte of the character aforesaid that is safe to use, and has low toxicity, and sensitization hazard characteristics.

A further object of the invention is to provide an electrolyte of the character aforesaid that is highly stable at elevated temperatures, and allows rapid processing.

Other objects and advantageous features of the invention will be apparent from the description and claims.

DESCRIPTION OF THE PREFERRED EMBODIMENTS

Batteries such as alkaline or alkaline earth metal batteries, and for example lithium batteries, consist of at least an anode layer, a polymer electrolyte layer, and a cathode layer. Such batteries can be of virtually any desired size and configuration, and usually include additional layers such as current conducting backing layers, insulating layers and electrode connection layers.

The polymer dilectric or electrolyte layer must be compatible with the component materials used to fabricate the batteries while possessing suitable ionic conductivity.

In such a battery a base (not shown) is provided which can be a web of material such as nickel foil or carbon fibres coated with a cathode material of well known type.

The cathode may then have an additional layer (not shown) of polymeric electrolyte composition applied thereto, which composition may be of any well known polymeric material such as polyethylene oxide and propylene carbonate compounded with lithium salt.

An additional layer (not shown) of anode material is applied on top of the electrolyte layer, which is a base layer of carbon fibers coated with lithium as described in our prior U.S. Pat. No. 4,794,059, or lithium foil to form an anode layer (not shown).

The resultant battery can be provided with other layers as desired.

The electrolyte material may have an epoxide based polymer mixed therein which is ultraviolet light, or electronbeam curable and which upon curing forms a solid state or semi-solid state electrolyte.

The polymeric electrolyte composition, which is suitable for many electrolytes, contains propylene carbonate in the range of 30% to 95% by weight, an ion conductive salt in the range of 1 to 30% by weight, and polyethylene oxide in the range of 0.2% to 60% by weight, and an epoxide based polymer, in the range of 2% to 60% by weight the epoxide based polymer can be of any suitable type with the preferred cycloaliphatic component being "ENVIBAR" UV-1244 as available from Union Carbide Co., St. Louis, Mo.

The described composition is electronbeam curable, but if it is desired to cure it by ultraviolet light exposure a well known photo initiator in the range of 0.2 to 20% by weight of the epoxide based polymer must be added, which upon ultraviolet light exposure forms a catlyst causing the polymer to cross link a preferred photo initiator is UVI 6990, a triaryl sulfonium hexafluorophosphate salt available from Union Carbide Co., St. Louis, Mo. which is mixed with propylene carbonate in a 50/50% ratio.

A preferred embodiment of the invention is illustrated in the following example:

EXAMPLE

A sample of polymeric electrolyte composition was formed by compounding a lithium salt and a polymeric material which consisted of 74% (percent) by weight of Propylene carbonate (PC), 10% (percent) by weight of ionconductive salt (such as Lithium Triflate but other ionconductive salts may be used), 1% (percent) by weight of Polyethylene Oxide (PEO) and 15% (percent) by weight of a Ultraviolet light curable cycloaliphatic epoxide based component which was "ENVIBAR" UV-1244 and contained 2% (percent) by weight of a photo initiator formed catalyst which was UVI 6990 and 11% (percent) by weight of polyurethane (POLYOL).

The mixture was heated to 105 degrees C. and became liquid, the hot liquid was applied to an electrode layer, by spraying and formed an ion-conductive layer of desired and required thickness. After deposition, this layer was exposed to ultraviolet light radiation.

Due to the ultraviolet exposure the electrolyte was cured (crosslinked) to a solid or semisolid state, by means of the highly active catalyst in the epoxide that was formed when the photoinitiator was photolyzed by the ultraviolet light radiation.

It should be noted that after the minimum threshold of ultraviolet light exposure is attained, the polymerization proceeds without further ultraviolet exposure, even in areas shadowed from the radiation, which makes it also suitable for electrode construction. Because the electrolyte is deposited as a hot liquid, this further enhances and accelerates the curing process, and shortens the production time.

It should be noted that the electrolyte containing the epoxide based component can also be cured by electronbeam radiation, which mixture would then not require the admixture of a photoinitiator.

While the epoxide based component is described for use in a lithium based battery, it is suitable for many other electrolytes and batteries.

It should, of course, be understood that the description is merely illustrative and that various modifications and changes can be made in the structure disclosed without departing from the spirit of the invention.

It is thus apparent that the objects of the invention have been achieved.

We claim:

1. A solid state polymeric electrolyte composition for batteries wherein the electrolyte contains an epoxide based polymer component, and
   said epoxide component is cycloaliphatic epoxide.
2. A polymeric electrolyte composition as described in claim 1 in which
   urethane in the range of 2% to 25% by weight has been added to the epoxide based component.
3. A polymeric electrolyte composition as described in claim 1 in which
   polyurethane in the range of 2% to 25% by weight has been added to the epoxide based component.
4. A polymeric electrolyte composition as described in claim 1 in which
   a photoinitiator in the range of 0.2% to 20% by weight of the epoxide based component has been added to it, which is ultraviolet light radiation curable by means of a catalyst formed by the photolyzing of the photo initiator.
5. A polymeric electrolyte as described in claim 1 in which
   the composition is curable by electronbeam radiation.
6. A polymeric electrolyte composition as described in claim 1 wherein the composition can be used for electrode construction.
7. A polymeric electrolyte composition as defined in claim 1 wherein the composition can replace any liquid electrolyte.
8. A solid state polymeric electrolyte composition for alkaline and alkaline earth metal batteries which includes a polymeric material which contains propylene carbonate in the range of 30% to 95% by weight, an ion conductive salt in the range of 1% to 30% by weight, polyethylene oxide in the range of 0.2% to 45% by weight and an ultraviolet light or electronbeam curable epoxide based polymer in the range of 2% to 60% by weight.

* * * * *